(12) United States Patent
Nakao

(10) Patent No.: US 7,142,389 B2
(45) Date of Patent: Nov. 28, 2006

(54) TAPE DRIVE

(75) Inventor: Toru Nakao, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 12 days.

(21) Appl. No.: 11/128,153

(22) Filed: May 13, 2005

(65) Prior Publication Data

US 2005/0254161 A1   Nov. 17, 2005

(30) Foreign Application Priority Data

May 14, 2004   (JP)   ............................... 2004-145431

(51) Int. Cl.
G11B 5/584   (2006.01)
G11B 20/20   (2006.01)
G11B 15/18   (2006.01)

(52) U.S. Cl. .................. 360/77.12; 360/76; 360/71

(58) Field of Classification Search ............ None
See application file for complete search history.

(56) References Cited

U.S. PATENT DOCUMENTS

| | | | |
|---|---|---|---|
| 5,689,384 A | 11/1997 | Albrecht et al. | |
| 6,222,698 B1 * | 4/2001 | Barndt et al. | 360/76 |
| 6,563,659 B1 * | 5/2003 | Fasen | 360/71 |
| 6,937,425 B1 * | 8/2005 | Knowles et al. | 360/77.12 |
| 2005/0018349 A1 * | 1/2005 | Eaton | 360/129 |
| 2005/0036227 A1 * | 2/2005 | Hoerger | 360/63 |

* cited by examiner

*Primary Examiner*—Andrew L. Sniezek
(74) *Attorney, Agent, or Firm*—Sughrue Mion, PLLC

(57) ABSTRACT

A tape drive of the present invention records data on a tape having a plurality of servo bands, where a servo signal is recorded in advance along a longitudinal direction, and a data band containing a plurality of data tracks formed between each of the servo bands while tracking the tape, based on a servo signal: the tape drive comprises a tape running system for running the tape between two reels that can wind it; and a data recording head comprising a pair of servo read elements provided corresponding to the servo band, and data write elements provided plurally side by side between the pair of the servo read elements, wherein when recording the data, the tape drive writes a condition in recording, which is obtained by reading the servo signal with the servo read elements, in at least one of the data tracks with the data write elements.

23 Claims, 4 Drawing Sheets

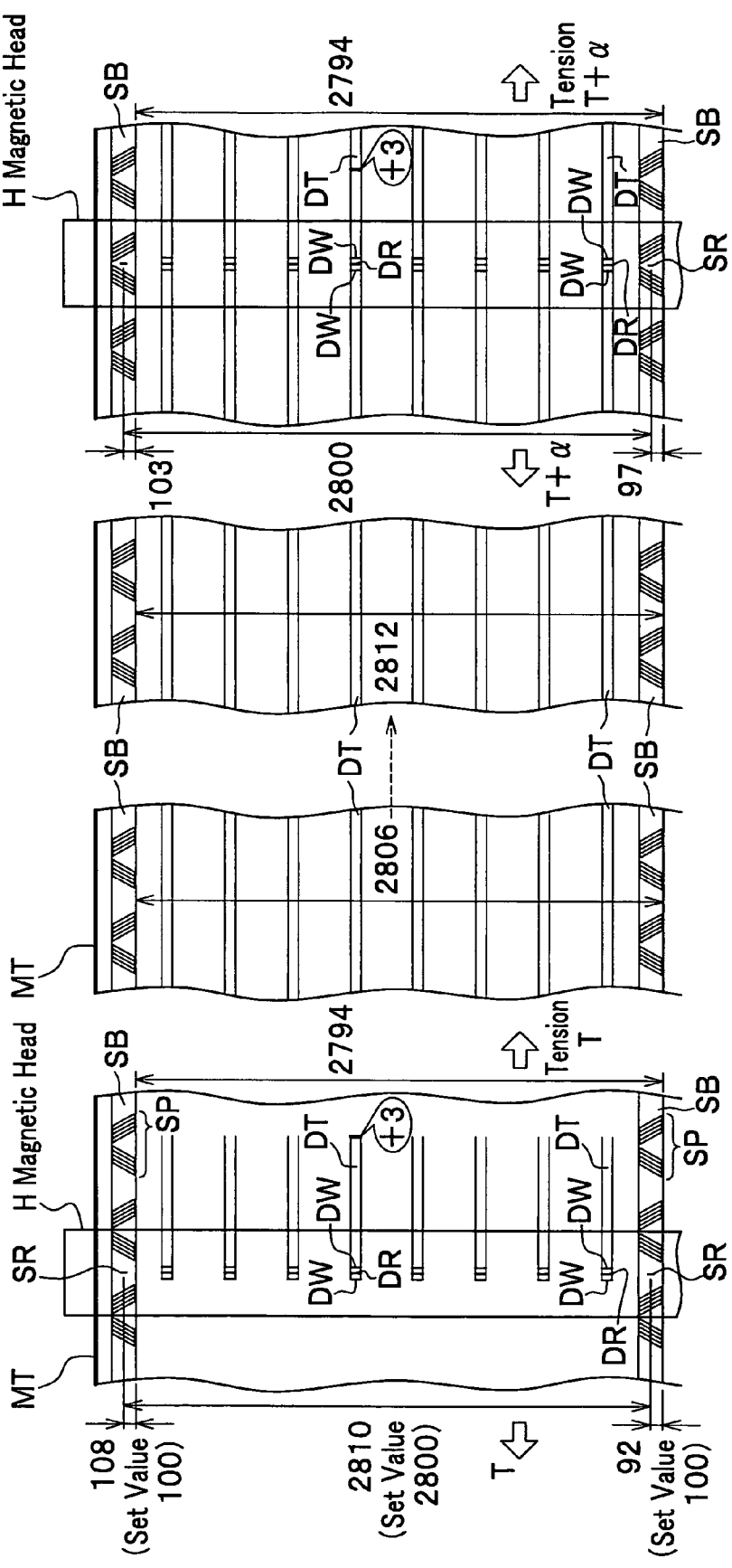

TAPE DRIVE

BACKGROUND OF THE INVENTION

1. Field of the Invention

The present invention relates to a magnetic tape system and a tape drive for data recording, and particularly, to a magnetic tape system and a tape drive that enable high density recording and reproducing of data highly densely recorded.

2. Description of the Related Art

These years, in a magnetic tape high density recording progresses, and there is one that has a data capacity of around 200 GB for a backup of a computer. Therefore, on the magnetic tape several hundreds of data tracks are formed in lateral directions thereof. Accordingly, a width of the data tracks is designed to be very narrow, and a distance of neighboring data tracks is also very narrow. Consequently, in order to make write/read elements of a magnetic head trace the data tracks, in such a magnetic tape drive a servo signal is written in the magnetic tape in advance, and servo-controls a position of the magnetic head (position in lateral directions of the magnetic tape) while reading the servo signal with the magnetic head (JP 08-30942A (U.S. Pat. No. 5,689,384)).

Whereas, the width of the data tracks of the magnetic tape is designed to be extremely narrow such as several μm to several tens μm and is hereafter also foreseen to become narrower. Under such the condition, it is concerned that a deformation of the magnetic tape itself changes a pitch and positional relationship of the data tracks and influences on right and wrong of a tracking.

For example, because a magnetic tape is generally composed of a magnetic layer's being coated on a resin film, there occurs a change in a width of the magnetic tape by the resin film's swelling/drying or expanding/contracting. When such the change occurs after data recording on the magnetic tape, the pitch and positional relationship of data tracks on the magnetic tape do not match those of data read elements on a magnetic head, it cannot be avoided that part of the data tracks becomes off track by only tracking-control through the servo signal.

Not limited to the magnetic tape, such a problem similarly occurs in an optical tape for recording data by light.

Consequently, it is strongly requested a tape drive for data recording adequate for high density recording.

SUMMARY OF THE INVENTION

In order to solve the problem, in data recording the present invention records a condition thereof, and in data reproducing, enables high density recording and reproducing of data by adjusting a tension of a tape and repeating a similar condition in the data recording.

In other words, the present invention is a magnetic tape system and a tape drive that record data in a tape having a plurality of servo bands, where a servo signal is recorded in advance along a longitudinal direction, and a data band containing a plurality of data tracks formed between each of the servo bands while tracking the tape, based on the servo signal: the tape drive comprises a tape running system for running the tape between two reels that can wind the tape; and a data recording head that is arranged on a running path of the tape, and comprises a pair of servo read elements provided corresponding to the servo band, and data write elements provided plurally side by side between the pair of the servo read elements, wherein when recording the data, the tape drive is designed to write a condition in recording, which is obtained by reading the servo signal with the servo read elements, in at least one of the data tracks with the data write elements.

In accordance with such a magnetic tape system and a tape drive, because a condition in recording is written in at least one of data tracks, data can be surely reproduced if the condition is read in reproducing and a similar condition is repeated.

And in order to concretely record the condition, it is preferable to be designed so that: the tape drive comprises a controller for controlling operations of the tape running system and the data recording head, wherein the controller comprises a tracking control unit for performing position control of the data recording head; and a displacement amount recoding unit for writing, by the data write elements in at least one of the plurality of the data tracks, a value of a displacement amount from: a predetermined set value of a pitch of the servo bands in recording the data, which is obtained from a value showing a relative position between the tape and the data recording head obtained from each servo signal read with the pair of the servo read elements; and a value showing a pitch of the pair of the servo read elements memorized in advance.

And it is preferable that: the tracking control unit performs tracking control of the data recording head so that a displacement amount due to a difference between a pitch of the pair of servo read elements and that of a corresponding pair of servo bands is distributed between the pair of the servo read elements; and the displacement amount recording unit records the displacement amount with at least a central data write element out of the plurality of data write elements.

Because such a tape drive writes a displacement amount with at least a central data write element out of a plurality of data write elements while performing tracking control so as to distribute a difference between a pitch of a pair of servo read elements and that of a corresponding pair of servo bands to the pair of the servo read elements, the tape drive records the displacement amount on a central data track out of data tracks belonging to one data band. If so, the displacement amount results in being always recorded on the center of the data band, that is, being accurately recorded on the center of a pair of servo bands. Accordingly, If when reproducing data by another tape drive, tracking control of a data reproducing head is performed so as to distribute a difference between the pitch of the pair of the servo read elements and that of a pair of servo bands to the pair of the servo read elements, a central data read element certainly becomes on track; therefore a value of a displacement amount can be surely read.

Meanwhile, when a number of data write elements is odd, the central data write element means one data write element positioned at center; when that of the data write elements is even, the central data write element means one or both data write elements out of two data write elements positioned at center.

And it is preferable to be designed so that: the tape drive further comprises a data reproducing head that is arranged on a running path of the tape and has a pair of servo read elements, which is provided corresponding to the servo bands, and data read elements provided plurally side by side between the pair of the servo read elements, wherein the tape running system comprises a tape tension adjustment mechanism for adjusting a tension of the tape, wherein the controller comprises an adjustment amount computation unit for computing an adjustment amount for changing a pitch of the servo bands so that a relationship between the pitch of the servo bands and that of the pair of the servo read elements in the data reproducing head becomes equivalent in recording, based on a value of the displacement amount read from a predetermined data track by the data reproducing head and a value that is memorized in advance and shows the pitch of the servo read elements in the data reproducing head; and a tension control unit for controlling the tension of the tape by the tension adjustment mechanism, based on the adjustment amount computed by the adjustment amount computation unit.

In accordance with such a tape drive it is enabled to adjust a tape width by adjusting a tension thereof, to thereby repeat a similar condition in data recording, and to accurately position a data read element on a data track.

In addition, it is preferable in the tape drive that the data recording head and the data reproducing head are integrally formed. Thereby it becomes easy to match a positional relationship between a data write element and a data read element.

Meanwhile, as a dedicated drive for reproducing data recorded by the tape drive can be also designed a tape drive that has a plurality of servo bands, where servo signals are written along lateral directions in advance, and a data band containing a plurality of data tracks formed between each of the servo bands, and reproduces the data from a tape, where a displacement amount from a predetermined set value of a pitch of the servo bands in data recording is recorded, on at least one of the data tracks: the tape drive comprises a tape running system that comprises at least a tension adjustment mechanism for adjusting a tension of the tape, and runs the tape between two reels that can wind the tape; a data reproducing head that is arranged on a running path of the tape, and has a pair of servo read elements provided corresponding to the servo bands, and data read elements provided plurally side by side between the pair of the servo read elements; and a controller for controlling operations of the tape running system and the data recording head, wherein the controller comprises an adjustment amount computation unit for computing an adjustment amount for changing the pitch of the servo bands so that a relationship between the pitch of the servo bands and that of the pair of the servo read elements in the data reproducing head becomes equivalent in recording, based on a value of the displacement amount read from a predetermined data track by the data reproducing head and a value that is memorized in advance and shows the pitch of the servo read elements in the data reproducing head; and a tension control unit for controlling a tension of the tape by the tension adjustment mechanism, based on the adjustment amount computed by the adjustment amount computation unit.

BRIEF DESCRIPTION OF THE DRAWINGS

FIGS. 4A to 4D are plan drawings of the magnetic tape for illustrating an operation of the magnetic tape drive: FIG. 4A is a state of data being recorded by a Drive A; FIG. 4B is a state of a tension being released; FIG. 4C is a state of the magnetic tape being swelled; and FIG. 4D is a state of the data being reproduced by a Drive B.

DESCRIPTION OF THE PREFERRED EMBODIMENTS

Here will be described an embodiment of the present invention in detail, referring to drawings as needed.

Hereinafter as an example of a tape drive will be described a magnetic tape drive for recording and reproducing data on a magnetic tape.

Figure 1:
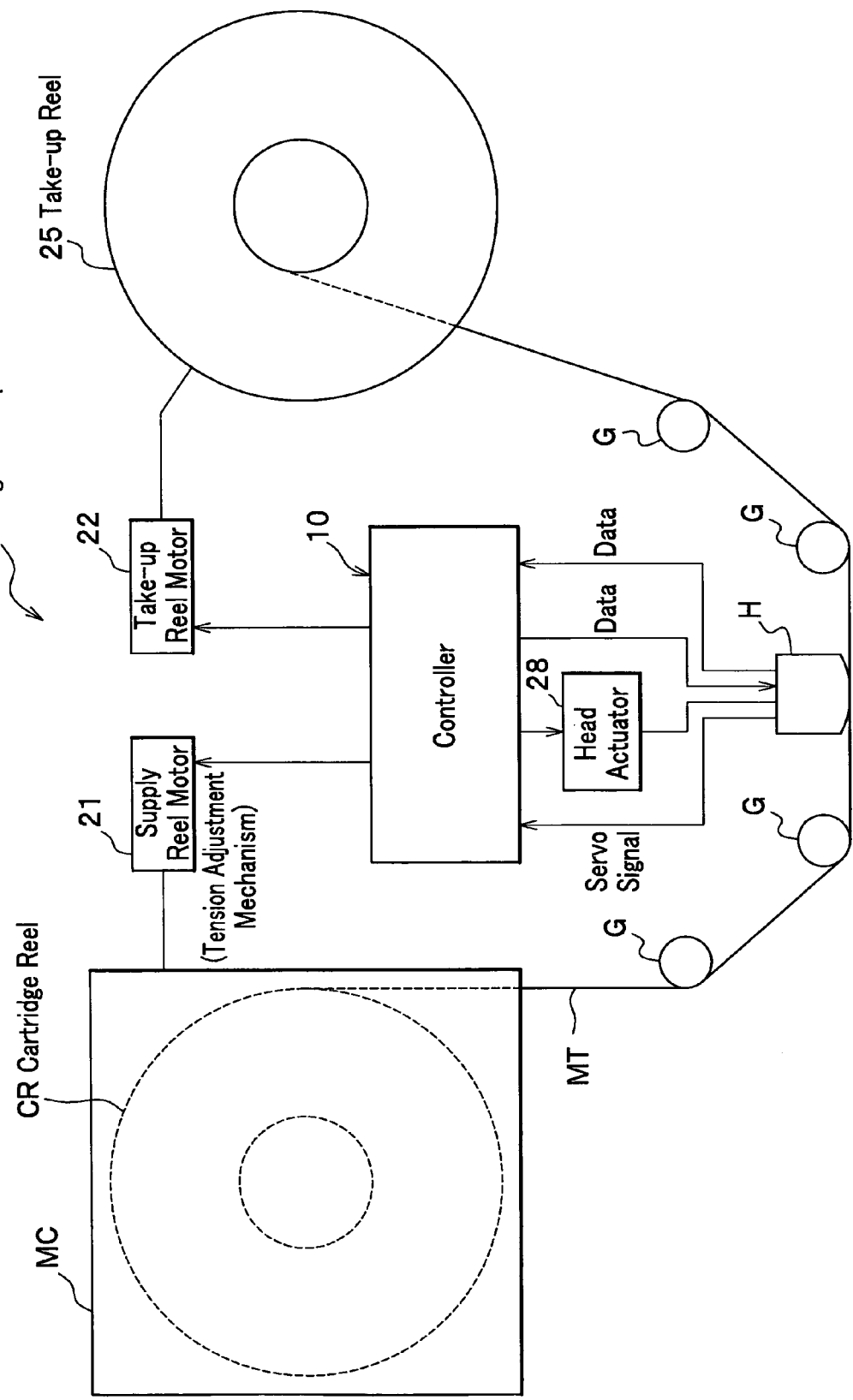
FIG. 1 is a schematic drawing of a magnetic tape drive related to an embodiment of the present invention.

As shown in FIG. 1, a magnetic tape drive 1 related to the embodiment is an apparatus for pulling out a magnetic tape MT from a magnetic tape cartridge MC, and for recording and reproducing data by a magnetic head H.

The magnetic tape drive 1 mainly comprises a magnetic tape running system for running the magnetic tape MT and the magnetic head H arranged on a path where the magnetic tape MT runs.

The magnetic tape running system comprises a supply reel motor 21 for rotationally driving a cartridge reel CR within the magnetic tape cartridge MC; a take-up reel 25 for winding and rewinding the magnetic tape MT sent out from the cartridge reel CR; a take-up reel motor 22 for rotationally driving the take-up reel 25; a controller 10 for controlling operations of the supply reel motor 21 and the take-up reel motor 22; and a plurality of guide rollers G for guiding a running of the magnetic tape MT.

The supply reel motor 21 gives a pertinent tension to the magnetic tape MT by adjusting a rotation speed and rotation torque of the cartridge reel CR, depending on a speed of the magnetic tape MT wound by the take-up reel 25. In other words, the supply reel motor 21 becomes a tension adjustment mechanism. And a tension of the magnetic tape MT is, as described later, finely adjusted by rotation control of the supply reel motor 21 by the controller 10.

Meanwhile, although in the embodiment the tension of the magnetic tape MT is controlled by the control of the rotation speed and rotation torque of the supply reel motor 21, it is also available to apply a tension adjustment mechanism using a dancer roller and another tension adjustment mechanism of pulling a magnetic tape in a vacuum chamber.

Figure 2:
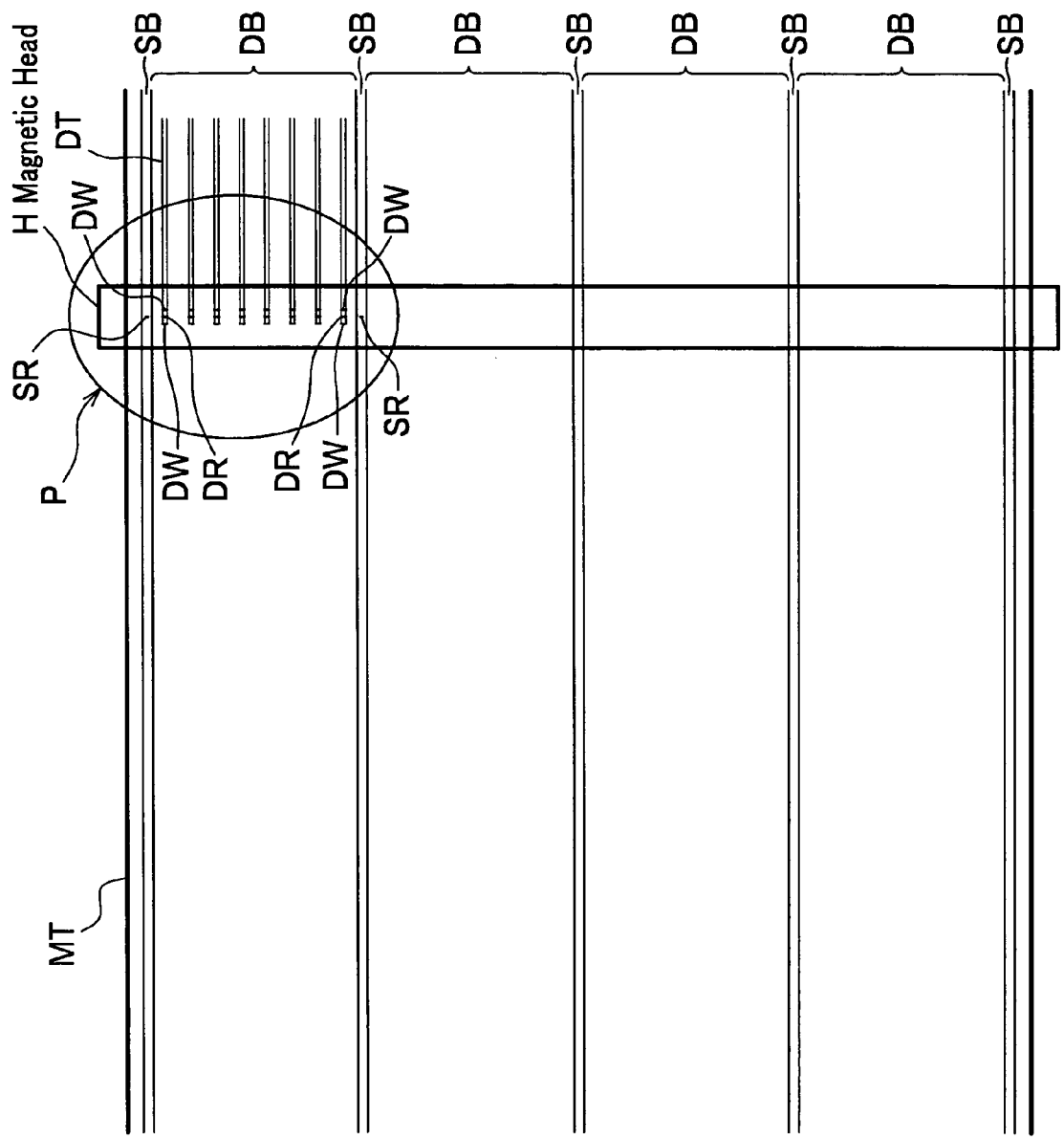
FIG. 2 is a plan drawing of a magnetic tape and a magnetic head.

The magnetic tape MT comprises, as shown in FIG. 2, five servo bands SB at a same pitch along a longitudinal direction of the magnetic tape MT, that is, a running direction. Making at least one pair of non-parallel magnetized areas one servo pattern SP so that a relative position of the magnetic head H contacting the magnetic tape MT is discerned, in the servo bands SB the servo pattern SP is written at a predetermined pitch in lateral directions of the magnetic tape MT (see FIG. 4A). As proved by referring to FIG. 4A, in the servo pattern SP of the embodiment, something is formed as one pattern where a plurality of magnetized areas of which upper sides slant toward one side, right in FIG. 4A, and those of which upper sides slant toward the opposite side, left, plurally continue, respectively.

In addition, the magnetic tape MT comprises data bands DB having a plurality of data tracks DT between each of the servo bands SB. On each of the data bands DB are formed, for example, 96 data tracks DT.

As shown in FIG. 2, the magnetic head H is formed in a size contacting across all width of the magnetic tape MT. And on a contact face with the magnetic tape MT servo read elements SR for reading servo signals from the servo bands SB are formed at positions corresponding to each one servo band SB at each side of one data band DB. In addition, between the servo read elements SR are formed data read elements DR, which reproduce data from the data band DB between the two servo bands SB, at a same pitch side by side in lateral directions. In the embodiment, for example, eight data read elements DR are formed.

At both sides of each of the data read elements DR, that is, at both sides of a longitudinal direction of the magnetic tape MT of the data read element DR are formed data write elements DW for recording data on the data track DT. Meanwhile, in recording data, in order to read and verify the data immediately after recording the data, it is preferable that the data read element DR is positioned at backward of the data write elements DW with respect to a running direction of the magnetic tape MT. Then in order to record and reproduce the data at both times when pulling out the magnetic tape MT from the cartridge reel CR and rewinding it, the data read element DR is arranged so as to be positioned between the two data write elements DW.

For example, when the magnetic tape MT is pulled out of the cartridge reel CR, such the magnetic head H records and reproduces data at a same time for a group of eight data tracks DT by eight data read elements DR and eight data write elements DW of one side (for example, left in FIG. 2) in parallel with the elements DR; when the magnetic tape MT is rewound onto the cartridge reel CR, the magnetic head H slightly shifts in a lateral direction of the magnetic tape MT, and records and reproduces data at a same time for the group of the eight data tracks DT by the eight data read elements DR and eight data write elements DW of the other side (for example, right in FIG. 2) in parallel therewith.

In addition, in FIG. 2, although the data read elements DR and the data write elements DW are positioned at the uppest data band DB, the magnetic head H shifts in the lateral direction of the magnetic tape MT and records and reproduces data when recording and reproducing data for other data bands DB.

Furthermore, tracking control of the magnetic head H is performed by a head actuator 28 (see FIG. 1) so that the magnetic head H accurately grasps its own position for the magnetic tape MT, and so that the data read elements DR and the data write elements DW match desired data tracks DT. The control of the head actuator 28 is controlled by the controller 10.

The head actuator 28 is fixed at a frame not shown of the magnetic tape drive 1; the magnetic head H is fixed at the head actuator 28. The head actuator 28 comprises a voice coil motor or piezoelectric element driven by a tracking signal of the controller 10.

Next will be described the controller 10, referring to FIG. 3.

As described above, the controller 10 performs the tracking control of the magnetic head H, controls the rotation speed and rotation torque of the supply reel motor 21, and thus pertinently controls the tension of the magnetic tape MT.

Figure 3:
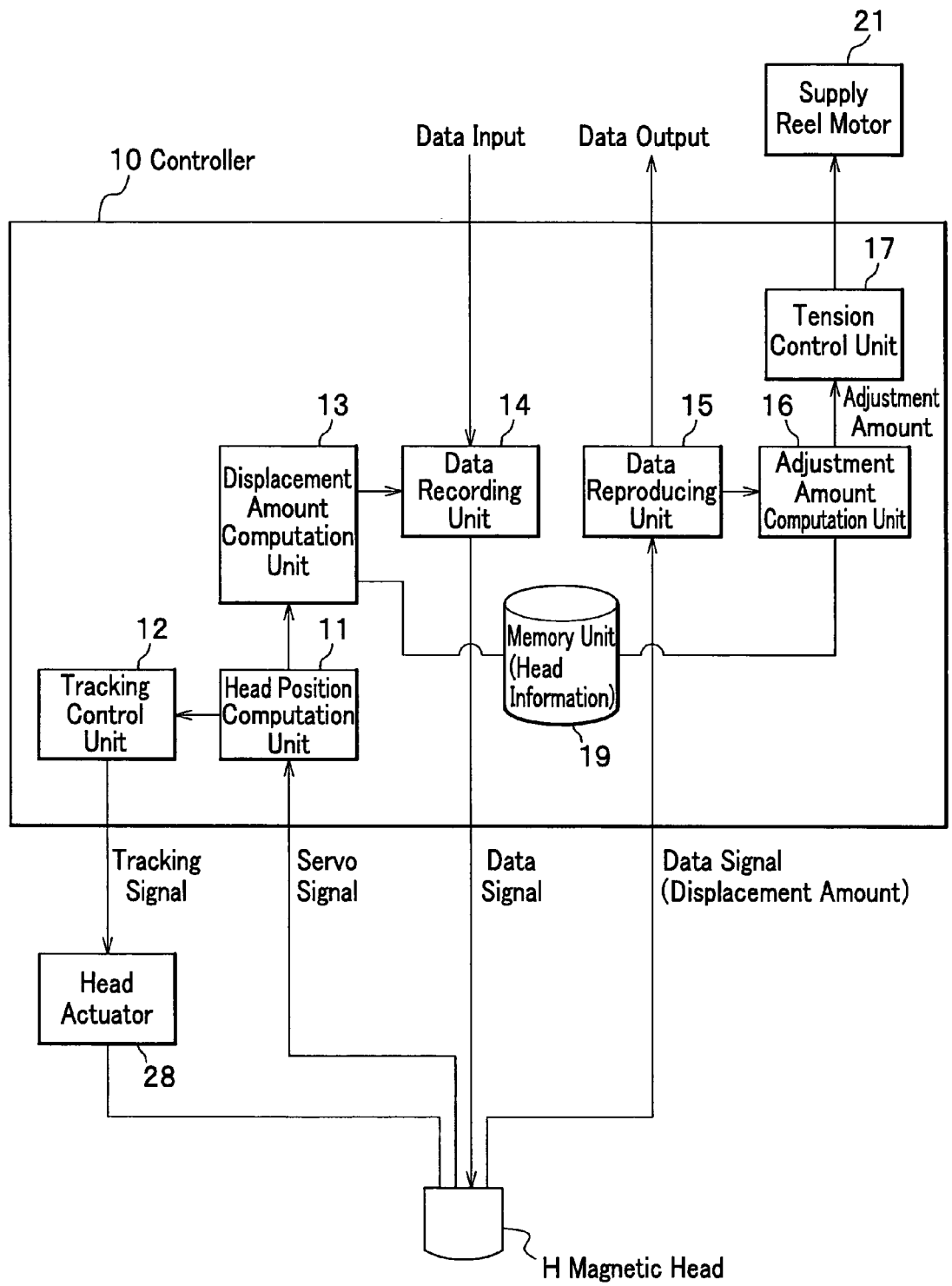
FIG. 3 is a block diagram illustrating a controller of the magnetic tape drive of the embodiment.

As shown in FIG. 3, the controller 10 comprises a head position computation unit 11, a tracking control unit 12, a displacement amount computation unit 13, a data recording unit 14 (displacement amount recording unit), a data reproducing unit 15, and an adjustment amount computation unit 16, a tension control unit 17, and a memory unit 19.

To the head position computation unit Hare input signals read with the servo read elements SR of the magnetic head H, and the unit 11 computes a relative position of the magnetic head H for the magnetic tape MT. In the embodiment intermittent pulse signals are read from the servo patterns SP, and the head position computation unit 11 computes at which portion the servo read elements SR are positioned within the servo bands SB from a timing of the pulse signals. A computation result thereof is output to the tracking control unit 12 and then to the displacement amount computation unit 13.

The tracking control unit 12 performs the tracking control of the magnetic head H, based on information of a head position output from the head position computation unit 11. In other words, when the head position is displaced toward an upper side for the data tracks DT currently recorded/reproduced, the tracking control unit 12 outputs a tracking signal to the head actuator 28 so as to shift the magnetic head H toward a lower side; when the head position is displaced toward the lower side, the tracking control unit 12 outputs a tracking signal to the head actuator 28 so as to shift the magnetic head H toward the upper side.

Meanwhile, although there is normally a slight error between a pitch of the servo bands SB in the magnetic tape MT and that of the servo read elements SR in the magnetic head H, in that case the tracking control unit 12 controls the head position so as to distribute a displacement due to the error between both servo bands SB in question.

To the displacement amount computation unit 13 is input the head position computed by the head position computation unit 11, and the unit 13 computes a displacement amount from a set value of the servo read elements SR of the magnetic head H. In order to compute the displacement amount from the set value is used an actual pitch (or the displacement amount from the set value) of two servo read elements SR in the magnetic head H attached to the magnetic tape drive 1. Therefore, in the memory unit 19 is memorized information of the pitch of the servo read elements SR as head information. The information of the pitch is measured in advance by reading servo signals of a standard magnetic tape or by taking a microscopic image of the magnetic head H. A method of calculating the displacement amount will be described later.

To the data recording unit 14 is input data that is input to the magnetic tape drive 1 from outside, and the unit 14 generates a recording current to the magnetic head H. In other words, the data recording unit 14 adds data for an error detection, which is produced from input data, thereto and then encodes it to a digital signal for recording, thereafter makes the signal a pulse current for being recorded on the magnetic tape MT, and outputs it to the data write elements DW of the magnetic head H.

In the data recorded to the data recording unit 14 is also included data of the displacement amount computed by the displacement amount computation unit 13. The data of the displacement amount is recorded at a header of data of the data tracks DT. Particularly, it is preferable that the data of the displacement amount is recorded on the central data tracks DT out of the data tracks DT plurally (eight in the embodiment) existing in one data band DB. A reason why the displacement amount is recorded on the central data tracks DT exists in that: when controlling the head position with distributing an error between the pitch of the servo read elements SR and that of the servo bands SB to the two servo bands SB as described before, then in the central data tracks DT there hardly occurs a displacement between the data tracks DT and the data read elements DR accompanied with the error; the data of the displacement amount is surely read from the central data tracks DT. Meanwhile, when a number of the data tracks DT within one data band DB is even, the data of the displacement amount may be recorded to either one of the two central data tracks DT.

The data reproducing unit 15 reproduces data from the magnetic head H and outputs it outside. In other words, to the data reproducing unit 15 is input pulse signals reproduced by the data read elements DR of the magnetic head H, and the unit 15 amplifies the pulse signals, decodes data, performs an error check of the data, and thereafter outputs it outside. In the data is included the data of the displacement amount described above, and the data of the displacement amount is output to the adjustment amount computation unit 16.

To the adjustment amount computation unit 16 is input the data of the displacement amount output from the data reproducing unit 15, and the unit 16 computes an amount (adjustment amount) for adjusting a tension of the magnetic tape MT from the data of the displacement amount, and the pitch of the servo read elements SR in the magnetic tape drive 1 read from the memory unit 19.

The adjustment amount is a variation amount of the tension of the magnetic tape MT necessary for varying a width thereof so that a displacement amount when data to be currently produced is recorded and a displacement amount from a set value of current servo bands SB and servo read elements SR become equivalent.

The adjustment amount computed is output to the tension control unit 17.

To the tension control unit 17 is input the adjustment amount computed by the adjustment amount computation unit 16, and the unit 17 controls the tension of the magnetic tape MT by controlling the rotation speed and rotation torque of the supply reel motor 21 according to the adjustment amount.

An operation of the magnetic tape drive 1 thus configured will be described, referring to FIGS. 4A to 4D.

As assumptions of describing operations of the magnetic tape drive 1, in the embodiment a pitch of the servo read elements SR (for example, a distance between central positions of the servo read elements SR) is assumed 2800 µm; a pitch of each one servo band SB at each side of one data band DB of the magnetic tape MT (for example, a distance between lower end positions of the servo bands SB in FIG. 4A) is also assumed 2800 µm when a tension T is applied as a set value. In addition, in recording data on the data tracks DT shown in FIG. 4A, a set value of the servo read elements SR is assumed one that matches a position of 100 µm from each lower end of the servo bands SB.

In such the assumptions, in an example of a Drive A of FIG. 4A a pitch of the servo read elements SR (hereinafter the pitch is referred to as pitch $P_{SR}$) is 2810 µm, and results in becoming wider by 10 µm than the set value. On the other hand, in the servo bands SB of the magnetic tape MT a pitch thereof (hereinafter the pitch is referred to as pitch $P_{SB}$) results in being 2794 µm by the tension T being applied; the pitch results in becoming narrower by 6 µm than the set value.

Under such the condition the head position computation unit 11 of the controller 10 computes the position of the magnetic head H by servo signals read from the servo bands SB, the tracking control unit 12 performs tracking control so as to distribute a displacement due to a difference between the pitch $P_{SR}$ and the pitch $P_{SB}$ to upper/lower servo bands SB. In other words, because in this example the difference between the pitch $P_{SR}$ and the pitch $P_{SB}$ is 16 µm, the position of the magnetic head H is controlled so that the positions of the servo read elements SR are displaced 8 µm in the upper/lower servo bands SB, respectively.

Therefore, in the example of FIG. 4A the upper servo read element SR is positioned at a position of 108 µm from the lower end of the upper servo band SB; the lower servo read element SR is positioned at a position of 92 µm from the lower end of the lower servo band SB.

In the case of such the recording condition, taking the value of the pitch $P_{SR}$ read from the memory unit 19 into consideration, the displacement amount computation unit 13 calculates +3 as a displacement amount d. The displacement amount d indicates the displacement amount d from the set value of the upper servo read element SR for the upper servo band SB, and is obtained by a following equation:

$$d = Y - Y_{STD} - (P_{SR} - P_{STD})/2,$$

where Y, a position of an upper servo read element; $Y_{STD}$, a set value of a position of the upper servo read element; and $P_{STD}$, a set value of a pitch of servo read elements.

In the above example, because the servo read elements SR are displaced toward the upper side by +8 µm, with subtracting a displacement amount of 5 µm of one side due to the pitch $P_{SR}$, the displacement amount d results in:

$$d = 108 - 100 - (2810 - 2800)/2 = +3 \text{ µm}.$$

The displacement amount d (=+3 µm) is output to the data recording unit 14 and recorded at a header of data intended to be recorded on the central data tracks DT by the data write elements DW.

Next, Because when taking out the magnetic tape cartridge MC having the magnetic tape MT from the Drive A, the tension of the magnetic tape MT is released, the pitch $P_{SB}$ of the servo bands SB widens as shown in FIG. 4B and, for example, becomes 2806 µm.

Next, when preserving the magnetic tape cartridge MC for a long period, the magnetic tape MT swells due to a change of humidity in some case: FIG. 4C shows this case, and the pitch $P_{SB}$ of the servo bands SB results in becoming 2812 µm.

FIG. 4D shows a case of reproducing data from the magnetic tape MT of a swelled state by another magnetic tape drive (Drive B).

Meanwhile, in the Drive B the pitch $P_{SR}$ of the servo read elements SR of the magnetic head H results in becoming 2800 µm same as the set value.

In reproducing the magnetic tape MT by the Drive B, firstly, a recording address is detected while the Drive B is performing normal tracking control, and data starts to be reproduced from the data tracks DT. At this time the displacement amount of the data (+3 µm) is reproduced from the central data tracks DT and output to the adjustment amount computation unit 16.

The adjustment amount computation unit 16 of the Drive B reads the pitch $P_{SR}$ as head information from the memory unit 19, and computes an adjustment amount of a tension of the magnetic tape MT so that data intended to be currently reproduced becomes an equivalent condition to a recorded one. In the current example, taking it into consideration that the pitch $P_{SR}$ has become same as the set value, because the displacement amount d in recording is read as +3, the adjustment amount computation unit 16 controls the tension of the magnetic tape MT so that the position of the upper servo read element SR from the lower end of the upper servo band SB becomes 103 µm. Taking it into consideration that the magnetic tape MT becomes wider due to a swelling, the tension thereof is slightly stronger than the tension T in recording and is made T+α. Due to the tension T+α, the magnetic tape MT contracts in lateral directions thereof, and a positional relationship between each of the data tracks DT and data read elements DR becomes pertinent.

The pitch $P_{SB}$ of the servo bands SB at this time is 2794 µm as shown in FIG. 4D, and becomes equivalent to that in recording by the Drive A.

Meanwhile, in the above example, because the magnetic tape MT becomes swelled after data recording, the tension results in being increased in data reproducing; in cases that the magnetic tape MT becomes elongated or dry and the width thereof becomes narrower, the tension of the magnetic tape MT results in being decreased in data reproducing.

In accordance with the magnetic tape drive 1 thus described, following effects can be obtained:

Even in cases that the width of the magnetic tape MT varies due to a swelling and a drying during a preservation or due to a placement condition (temperature and humidity) of the magnetic tape drive 1, because a condition (displacement amount) in data recording is recorded on the data tracks DT, it is enabled to accurately reproduce the data by reproducing the condition (displacement amount) in reproducing, and by repeating an equivalent condition through the tension control of the magnetic tape MT.

Thus it becomes enabled to make the pitch of the data tracks DT narrower, and to make the magnetic tape MT higher in recording density.

Meanwhile, because the present invention has been realized by focusing attention on the fact that the magnetic tape MT contracts in lateral directions by tension, a particularly remarkable effect is obtained in a case of a thinner magnetic tape in thickness, for example, a magnetic tape of which base film thickness is 3 to 8 μm.

Thus, although the embodiment of the present invention is described, the invention is not limited thereto and can be embodied with being changed as needed.

For example, although in the embodiment the magnetic head H comprises both of the data write elements DW and the data read elements DR, a data recording head comprising the data write elements DW and a data recording head comprising the data read elements DR may be separately provided.

In addition, although the embodiment is described with making the magnetic tape MT an example, it is also similarly applied to an optical tape drive for recording and reproducing data by laser light.

What is claimed is:

1. A tape drive for recording data in a tape having a plurality of servo bands, where a servo signal is recorded in advance along a longitudinal direction, and a data band containing a plurality of data tracks formed between each of said servo bands, while tracking the tape, based on said servo signal, the drive comprising:
   a tape running system for running said tape between two reels that can wind said tape; and
   a data recording head that is arranged on a running path of said tape, and comprises a pair of servo read elements provided corresponding to said servo band, and data write elements provided plurally side by side between said pair of the servo read elements,
   wherein when recording said data, the tape drive writes a condition in recording, which is obtained by reading said servo signal with said servo read elements, in at least one of said data tracks with said data write elements.

2. A tape drive according to claim 1 further comprising:
   a data reproducing head arranged on a running path of said tape, and having a pair of servo read elements provided corresponding to said servo bands and data read elements provided plurally side by side between the pair of the servo read elements, and
   said tape running system comprising:
   a tape tension adjustment mechanism for adjusting a tension of the tape, and
   said controller comprising:
   an adjustment amount computation unit for computing an adjustment amount for changing a pitch of said servo bands so that a relationship between the pitch of said servo bands and a pitch of said pair of the servo read elements in said data reproducing head becomes equivalent in recording, based on a value of said displacement amount read from a predetermined data track by said data reproducing head and a value that is memorized in advance and shows the pitch of the servo read elements in said data reproducing head; and
   a tension control unit for controlling the tension of said tape by said tension adjustment mechanism, based on the adjustment amount computed by said adjustment amount computation unit.

3. A tape drive according to claim 2, wherein said data recording head and said data reproducing head are integrally formed.

4. A tape drive according to claim 2, wherein said tension adjustment mechanism adjusts a tension of said tape by a rotation speed and rotation torque of a motor.

5. A tape drive according to claim 2, wherein said tension adjustment mechanism adjusts a tension of said tape by using a dancer roller.

6. A tape drive according to claim 2, wherein said tension adjustment mechanism adjusts a tension of said tape by pulling said tape in a vacuum chamber.

7. A tape drive according to claim 2, wherein said displacement amount is obtained, based on a following equation:

$$d=Y-Y_{STD}-(P_{SR}-P_{STD})/2,$$

where d, said displacement amount; Y, a position of one-side servo read element; $Y_{STD}$, a set value of a position of said one-side servo read element; $P_{SR}$, a pitch of said tape when a tension is applied by said tension adjustment mechanism; and $P_{STD}$, a set value of a pitch of servo read elements.

8. A tape drive for recording data on a tape having a plurality of servo bands, where a servo signal is recorded in advance along a longitudinal direction, and a data band containing a plurality of data tracks formed between each of said servo bands, while tracking the tape, based on said servo signal, the drive comprising:
   a tape running system for running said tape between two reels that can wind said tape;
   a data recording head comprising a pair of servo read elements provided corresponding to said servo band, and data write elements provided plurally side by side between said pair of the servo read elements; and
   a controller for controlling operations of said tape running system and said data recording head, said controller comprising:
   a tracking control unit for performing position control of said data recording head; and
   a displacement amount recoding unit for writing, by said data write elements in at least one of said plurality of the data tracks, a value of a displacement amount from: a predetermined set value of a pitch of said servo bands in recording said data, which is obtained from a value showing a relative position between said tape and said data recording head obtained from each servo signal read with said pair of the servo read elements; and a value showing a pitch of said pair of said servo read elements memorized in advance.

9. A tape drive according to claim 8, wherein said tracking control unit performs tracking control of said data recording head so that a displacement due to a difference between a pitch of said pair of servo read elements and a pitch of a corresponding pair of servo bands is distributed between said pair of the servo read elements; and said displacement amount recording unit records said displacement amount with at least a central data write element out of said plurality of data write elements.

10. A tape drive according to claim 9, wherein said displacement amount is obtained, based on a following equation:

$$d=Y-Y_{STD}-(P_{SR}-P_{STD})/2,$$

where d, said displacement amount; Y, a position of one-side servo read element; $Y_{STD}$, a set value of a position of said one-side servo read element; $P_{SR}$, a pitch of said tape when a tension is applied by said tension adjustment mechanism; and $P_{STD}$, a set value of a pitch of servo read elements.

11. A tape drive according to claim 8 further comprising:
a data reproducing head that is arranged on a running path of said tape, and has a pair of servo read elements provided corresponding to said servo bands, and data read elements provided plurally side by side between the pair of the servo read elements, and
said tape running system comprising:
a tape tension adjustment mechanism for adjusting a tension of the tape, and
said controller comprising:
an adjustment amount computation unit for computing an adjustment amount for changing a pitch of said servo bands so that a relationship between the pitch of said servo bands and a pitch of said pair of the servo read elements in said data reproducing head becomes equivalent in recording, based on a value of said displacement amount read from a predetermined data track by said data reproducing head and a value that is memorized in advance and shows the pitch of the servo read elements in said data reproducing head; and
a tension control unit for controlling the tension of said tape by said tension adjustment mechanism, based on the adjustment amount computed by said adjustment amount computation unit.

12. A tape drive according to claim 11, wherein said data recording head and said data reproducing head are integrally formed.

13. A tape drive according to claim 11, wherein said tension adjustment mechanism adjusts a tension of said tape by a rotation speed and rotation torque of a motor.

14. A tape drive according to claim 11, wherein said tension adjustment mechanism adjusts a tension of said tape by using a dancer roller.

15. A tape drive according to claim 11, wherein said tension adjustment mechanism adjusts a tension of said tape by pulling said tape in a vacuum chamber.

16. A tape drive according to claim 8, wherein said displacement amount is obtained, based on a following equation:

$$d=Y-Y_{STD}-(P_{SR}-P_{STD})/2,$$

where d, said displacement amount; Y, a position of one-side servo read element; $Y_{STD}$, a set value of a position of said one-side servo read element; $P_{SR}$, a pitch of said tape when a tension is applied by said tension adjustment mechanism; and $P_{STD}$, a set value of a pitch of servo read elements.

17. A tape drive that has a plurality of servo bands, where servo signals are written along lateral directions in advance, and a data band containing a plurality of data tracks formed between each of said servo bands, and reproduces said data from a tape, where a displacement amount from a predetermined set value of a pitch of said servo bands in data recording is recorded, on at least one of the data tracks, the drive comprising:
a tape running system that at least comprises a tension adjustment mechanism for adjusting a tension of said tape, and runs said tape between two reels that can wind said tape;
a data reproducing head that is arranged on a running path of said tape,
and has a pair of servo read elements provided corresponding to said servo bands, and data read elements provided plurally side by side between the pair of the servo read elements; and
a controller for controlling operations of said tape running system and said data recording head, and
said controller comprising:
an adjustment amount computation unit for computing an adjustment amount for changing the pitch of said servo bands so that a relationship between the pitch of said servo bands and a pitch of said pair of the servo read elements in said data reproducing head becomes equivalent in recording, based on a value of said displacement amount read from a predetermined data track by said data reproducing head and a value that is memorized in advance and shows the pitch of the servo read elements in said data reproducing head; and
a tension control unit for controlling a tension of said tape by said tension adjustment mechanism, based on the adjustment amount computed by said adjustment amount computation unit.

18. A tape drive according to claim 17, wherein said tension adjustment mechanism adjusts a tension of said tape by a rotation speed and rotation torque of a motor.

19. A tape drive according to claim 17, wherein said tension adjustment mechanism adjusts a tension of said tape by using a dancer roller.

20. A tape drive according to claim 17, wherein said tension adjustment mechanism adjusts a tension of said tape by pulling said tape in a vacuum chamber.

21. A magnetic tape system comprising:
a tape having a plurality of servo bands, where a servo signal is recorded in advance along a longitudinal direction, and a data band containing a plurality of data tracks formed between each of said servo bands, while tracking the tape, based on said servo signal;
a tape running system for running said tape between two reels that can wind said tape; and
a data recording head that is arranged on a running path of said tape, and comprises a pair of servo read elements provided corresponding to said servo band, and data write elements provided plurally side by side between said pair of the servo read elements,
wherein when recording said data, the tape drive writes a condition in recording, which is obtained by reading said servo signal with said servo read elements, in at least one of said data tracks with said data write elements.

22. A magnetic tape according to claim 21, wherein a thickness of a base film is 3 to 8 μm.

23. A magnetic tape system comprising:
a tape having a plurality of servo bands, where a servo signal is recorded in advance along a longitudinal direction, and a data band containing a plurality of data tracks formed between each of said servo bands, while tracking the tape, based on said servo signal, the drive comprising:

a tape running system for running said tape between two reels that can wind said tape;

a data recording head comprising a pair of servo read elements provided corresponding to said servo band, and data write elements provided plurally side by side between said pair of the servo read elements; and a controller for controlling operations of said tape running system and said data recording head, said controller comprising:

a tracking control unit for performing position control of said data recording head; and a displacement amount recoding unit for writing, by said data write elements in at least one of said plurality of the data tracks, a value of a displacement amount from: a predetermined set value of a pitch of said servo bands in recording said data, which is obtained from a value showing a relative position between said tape and said data recording head obtained from each servo signal read with said pair of the servo read elements; and a value showing a pitch of said pair of said servo read elements memorized in advance.

* * * * *